(12) United States Patent
Vázquez Castro et al.

(10) Patent No.: US 10,286,993 B2
(45) Date of Patent: May 14, 2019

(54) INFLATABLE PRESSURE BULKHEAD

(71) Applicant: AIRBUS OPERATIONS S.L., Getafe (ES)

(72) Inventors: Jesús Javier Vázquez Castro, Getafe (ES); Fernando Pereira Mosqueira, Getafe (ES)

(73) Assignee: Airbus Operations S.L., Getafe (ES)

( * ) Notice: Subject to any disclaimer, the term of this patent is extended or adjusted under 35 U.S.C. 154(b) by 246 days.

(21) Appl. No.: 15/366,126

(22) Filed: Dec. 1, 2016

(65) Prior Publication Data
US 2017/0158304 A1 Jun. 8, 2017

(30) Foreign Application Priority Data
Dec. 3, 2015 (EP) ..................... 15382604

(51) Int. Cl.
B64C 1/10 (2006.01)
B64C 1/34 (2006.01)
B64C 1/00 (2006.01)

(52) U.S. Cl.
CPC ............... B64C 1/10 (2013.01); B64C 1/34 (2013.01); B64C 2001/0072 (2013.01)

(58) Field of Classification Search
CPC .... B64C 1/00; B64C 1/10; B64C 1/34; B64C 2001/0072
See application file for complete search history.

(56) References Cited

U.S. PATENT DOCUMENTS

| 3,829,353 A | 8/1974 | Fisher | |
| 4,023,372 A * | 5/1977 | Presler | E21F 17/107 405/132 |
| 4,899,962 A * | 2/1990 | Mueller | B64D 25/00 160/354 |
| 5,062,589 A * | 11/1991 | Roth | B64C 1/10 244/117 R |
| 5,893,534 A * | 4/1999 | Watanabe | B64C 1/064 244/119 |
| 8,777,160 B2 * | 7/2014 | Dazet | B64C 1/10 244/117 R |
| 2007/0164152 A1 * | 7/2007 | Anderson | B64C 1/10 244/118.1 |
| 2013/0106079 A1 | 5/2013 | Jarboe et al. | |
| 2015/0144736 A1 * | 5/2015 | Joern | B64C 1/10 244/119 |
| 2015/0166167 A1 * | 6/2015 | Kies | B64C 1/10 244/119 |

FOREIGN PATENT DOCUMENTS

DE 1053319 3/1959
EP 0325756 8/1989

OTHER PUBLICATIONS

European Search Report, dated Apr. 4, 2016 priority document.

* cited by examiner

Primary Examiner — Richard R. Green
Assistant Examiner — Michael A. Fabula
(74) Attorney, Agent, or Firm — Greer, Burns & Crain Ltd.

(57) ABSTRACT

A pressure bulkhead for an aircraft comprising a fuselage. The pressure bulkhead comprises an inflatable element, suitable for being filled with air, which in turn comprises a cover which delimits an inner zone. The pressure bulkhead further comprises a seal suitable for providing an airtight seal between the cover and the fuselage of the aircraft.

14 Claims, 5 Drawing Sheets

INFLATABLE PRESSURE BULKHEAD

CROSS-REFERENCES TO RELATED APPLICATIONS

This application claims the benefit of the European patent application No. 15382604.5 filed on Dec. 3, 2015, the entire disclosures of which are incorporated herein by way of reference.

TECHNICAL FIELD OF THE INVENTION

The present invention is related to the field of aircraft parts, in particular to the field of pressure bulkheads.

BACKGROUND OF THE INVENTION

The pressurized zone of an aircraft is demarcated by the central part of the fuselage and two pressure bulkheads. These elements are intended to support the pressure difference between the pressurized zone and the non-pressurized zone, ensuring correct air tightness without significantly varying the volume defined by them.

Additionally, pressure bulkheads must comply not only with mechanical requirements, but also with operational requirements: these elements must be able to bear pressure differences in both directions without collapsing, and they must fulfil basic aeronautical requirements, e.g., safety and light weight, as well as space allocation requirements, i.e., not using up more space than necessary and optimizing space for payload and aircraft systems.

There are different structural concepts that solve the above mentioned pressure bulkhead requirements. A common solution is the dome pressure bulkhead, which is described in many patents, such as U.S. Pat. No. 5,062,589 A1 or US 2015/144736 A1. Other solutions provide for a combination of rigid supports and flexible sheets, connected in a discontinuous manner, such as the element shown in U.S. Pat. No. 8,777,160 B2.

SUMMARY OF THE INVENTION

The present invention provides a pressure bulkhead as an alternative solution to the aforementioned problem. All the features described in this specification, including the claims, description and drawings, can be combined in any way, except for the cases of mutually exclusive features.

According to a first aspect, the invention provides a pressure bulkhead for an aircraft comprising a fuselage, the pressure bulkhead comprising an inflatable element suitable for being filled with air, comprising a cover which delimits an inner zone, and sealing means suitable for providing an airtight seal between the cover and the fuselage of the aircraft.

This pressure bulkhead needs smaller space allocation than the classical dome-shaped pressure bulkhead Additionally, the use of flexible skins makes the pressure bulkhead of the present invention lighter than the traditional solutions made of rigid materials, such as metal or composite.

The pressure bulkhead of the invention provides a configuration which, on the one hand, meets safety requirements that establish the over pressure that bulkheads must bear.

This pressure bulkhead allows an easier and more versatile assembly onto the aircraft, either by attaching it to a frame or directly into the fuselage.

Manufacturing of this pressure bulkhead is simpler and less expensive, as there is no need for high pressures and temperatures in the manufacturing of parts.

In a particular embodiment, the cover comprises a first sheet and a second sheet, each of the first sheet and the second sheet comprising an inner side which faces the inner zone of the inflatable element; and an outer side, opposite to the inner side;

wherein the first sheet and the second sheet are attached to each other by means of attaching means.

In a particular embodiment, the sealing means comprise primary sealing fittings which are suitable for attaching at least one of the first and second sheets to the fuselage of the aircraft.

In a particular embodiment, the sealing means comprise an auxiliary sheet attached to at least one of the first and second sheets and secondary sealing fittings suitable for attach the auxiliary sheet to the fuselage of the aircraft. This allows a better control of the tightness, by making it independent of the joint between the pressure bulkhead and the fuselage.

In a particular embodiment, part of the outer side of the first sheet is attached to part of the inner side of the second sheet.

In a particular embodiment, part of the inner side of the first sheet is attached to part of the inner side of the second sheet.

In a particular embodiment, the attaching means comprise at least one of gluing means or thermal joining means.

In a particular embodiment, the inner zone of the inflatable element comprises at least one string that is attached to a point of the first sheet and a point in the second sheet, to set a maximum distance between the points. This allows a better control of the shape of the inflatable element.

In a particular embodiment, the inner zone of the inflatable element comprises an inner inflatable bag. This allows a better control of the shape of the inflatable element, and provides for safety redundancy. In a more particular embodiment, the inner zone of the inflatable bag comprises at least one string that is attached to two points of the inflatable bag to set a maximum distance between the points.

In a particular embodiment, the pressure bulkhead further comprises an inflation valve suitable for controlling the pressure inside the inflatable element. This allows a better control of the pressure of the inflatable element, making inflating and deflating easier.

In a particular embodiment, the cover is made of a material comprising fibers made of aramids, nylon or ultra-high-molecular-weight polyethylene, the material further comprising a coating. In a more particular embodiment, the coating comprises silicone or polyurethane.

BRIEF DESCRIPTION OF THE DRAWINGS

These and other characteristics and advantages of the invention will be clearly understood in view of the detailed description of the invention and further in view of the preferred embodiments of the invention, with reference to the drawings. Preferred embodiments are given just as examples and are not intended to limit the scope of the present invention.

DETAILED DESCRIPTION OF THE PREFERRED EMBODIMENTS

Having outlined objects of the invention, specific non-limitative embodiments are described hereinafter.

Figure 1:
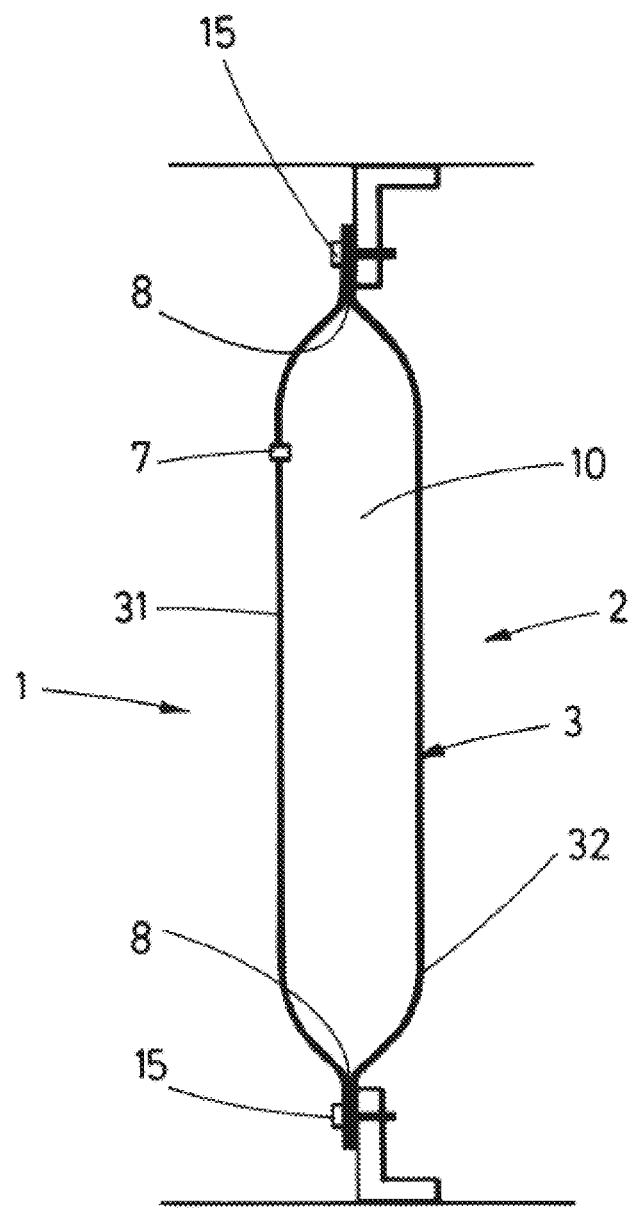
FIG. 1 shows a side view of a first embodiment of a pressure bulkhead according to the invention.

FIG. 1 shows a particular embodiment of a pressure bulkhead (1) according to the invention. This pressure bulkhead (1) comprises an inflatable element (2) suitable for being filled with air, comprising a cover (3) which delimits an inner zone (10), and sealing means (4) suitable for providing an airtight seal between the cover (3) and the fuselage of the aircraft.

In this particular embodiment, the cover (3) of the pressure bulkhead (1) comprises a first sheet (31) and a second sheet (32) attached together by means of attaching means (8). In different embodiments, this attaching means comprise glue or a thermal attachment, by heating both sheets (31, 32) and joining one to the other before cooling.

Each of the first sheet (31) and the second sheet (32) comprises an inner side which faces the inner zone (10) of the inflatable element (2), and an outer side, which is opposite to the inner side. In this particular embodiment, part of the inner side of the first sheet (31) is attached to part of the inner side of the second sheet (32), and the joint is attached to an element of the fuselage, such as a frame, by means of primary sealing fittings (15). In other embodiments, the joint is attached to the fuselage itself.

Figure 2:
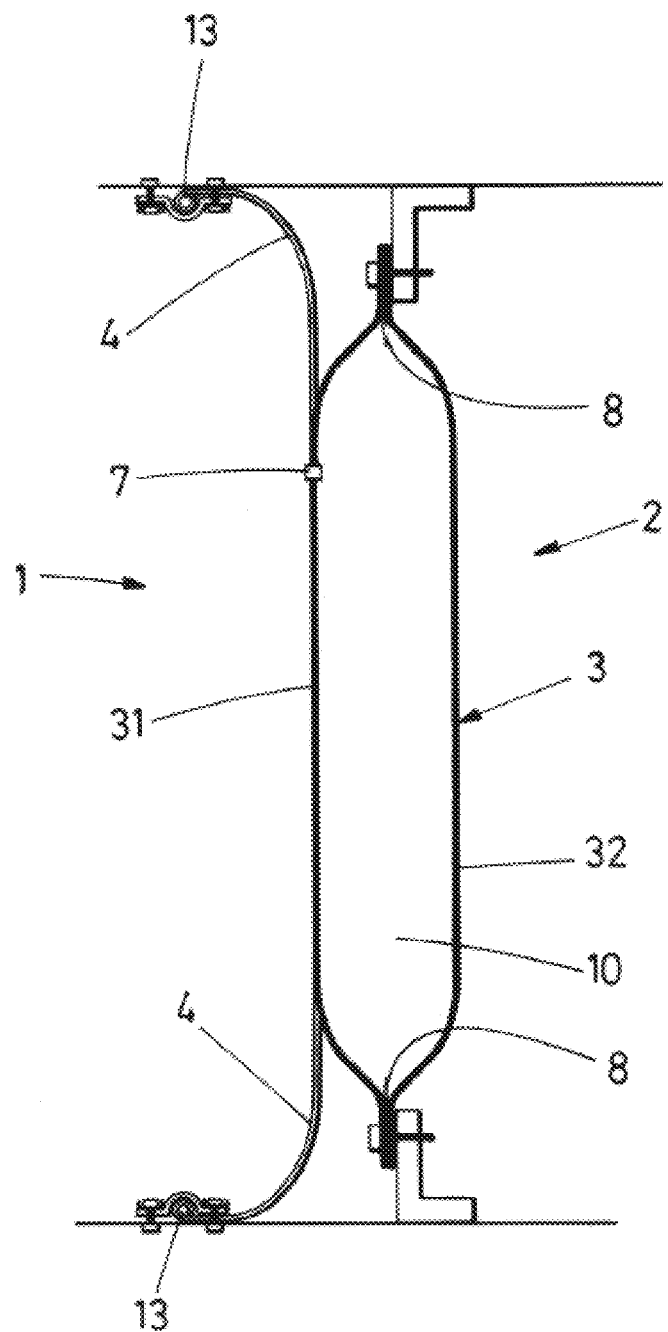
FIG. 2 shows a side view of a second embodiment of a pressure bulkhead according to the invention.

FIG. 2 shows a particular embodiment of a pressure bulkhead (1) according to the invention. The pressure bulkhead (1) shown in this figure is similar to the one shown in FIG. 1, but in this embodiment, the sealing means are an auxiliary sheet (4) that provides an airtight seal between one of the sheets (31, 32) and the fuselage. This is achieved by attaching the auxiliary sheet to the first sheet (31) and to the fuselage of the aircraft against which it needs to provide this airtight condition. The auxiliary sheet (4) is attached to the fuselage of the aircraft by secondary sealing fittings (13). In different embodiments, the attachment between the first sheet (31) and the sealing means (4) is made by gluing or thermal attachment, such as vulcanizing, by heating both elements and joining one to the other before cooling. In this particular embodiment, part of the inner side of the first sheet (31) is attached to part of the inner side of the second sheet (32), and the joint is attached to an element of the fuselage, such as a frame, by means of standard fittings. In other embodiments, the joint is attached to the fuselage itself.

Figure 3:
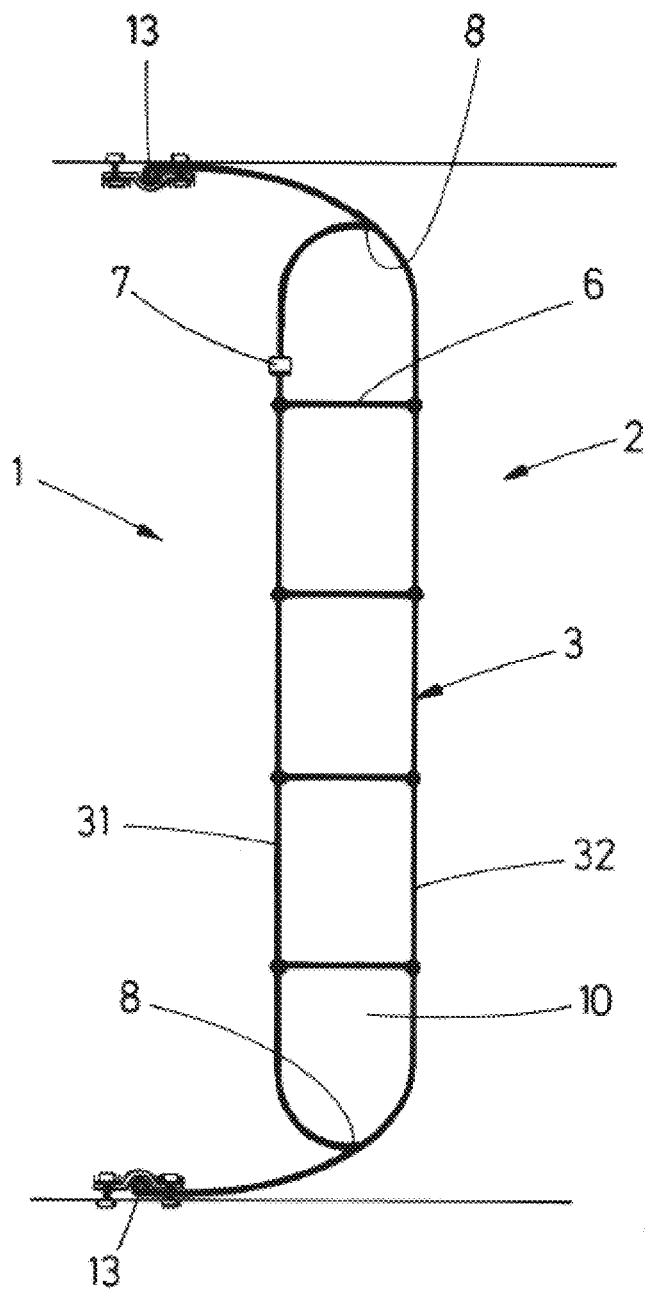
FIG. 3 shows a side view of a third embodiment of a pressure bulkhead according to the invention.

FIG. 3 shows another particular embodiment of a pressure bulkhead (1) according to the invention. In this particular embodiment, the inner zone of the inflatable element comprises a plurality of strings (6), each one of them being attached to a point of the first sheet (31) and to a point in the second sheet (32), thus setting a maximum distance between the points. In different embodiments, the strings (6) are arranged such that different shapes of the pressure bulkhead (1) are achieved.

In this particular embodiment, part of the outer side of the first sheet (31) is attached to part of the inner side of the second sheet (32), and in this case, the sealing means (4) are secondary sealing fittings (13) that attach at least one of sheets to the fuselage. In this case, the second sheet (32) is the sheet attached to the fuselage, by means of the secondary sealing fittings (13), while the first sheet (31) is attached to the second sheet (32). In other embodiments, primary sealing fittings (15) are used instead of secondary sealing fittings (13) to attach the second sheet (32) to the fuselage.

Figure 4A:
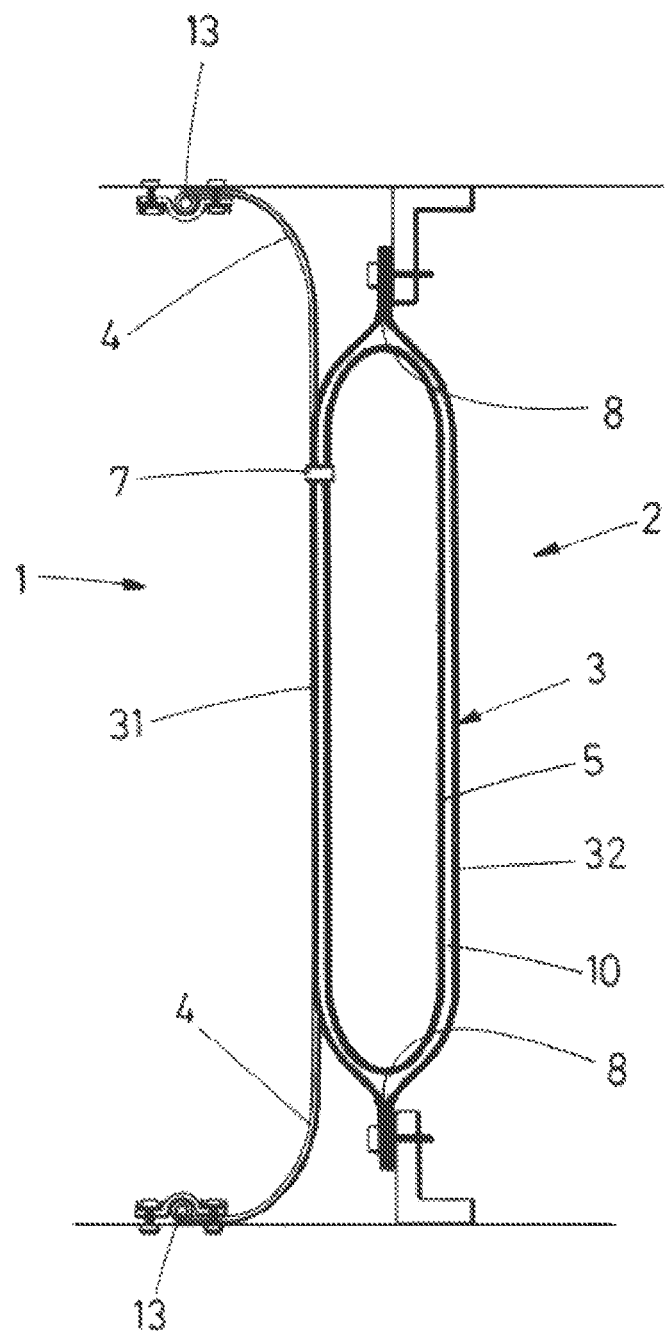
FIG. 4A shows a side view of a fourth embodiment of a pressure bulkhead according to the invention.
Figure 4B:
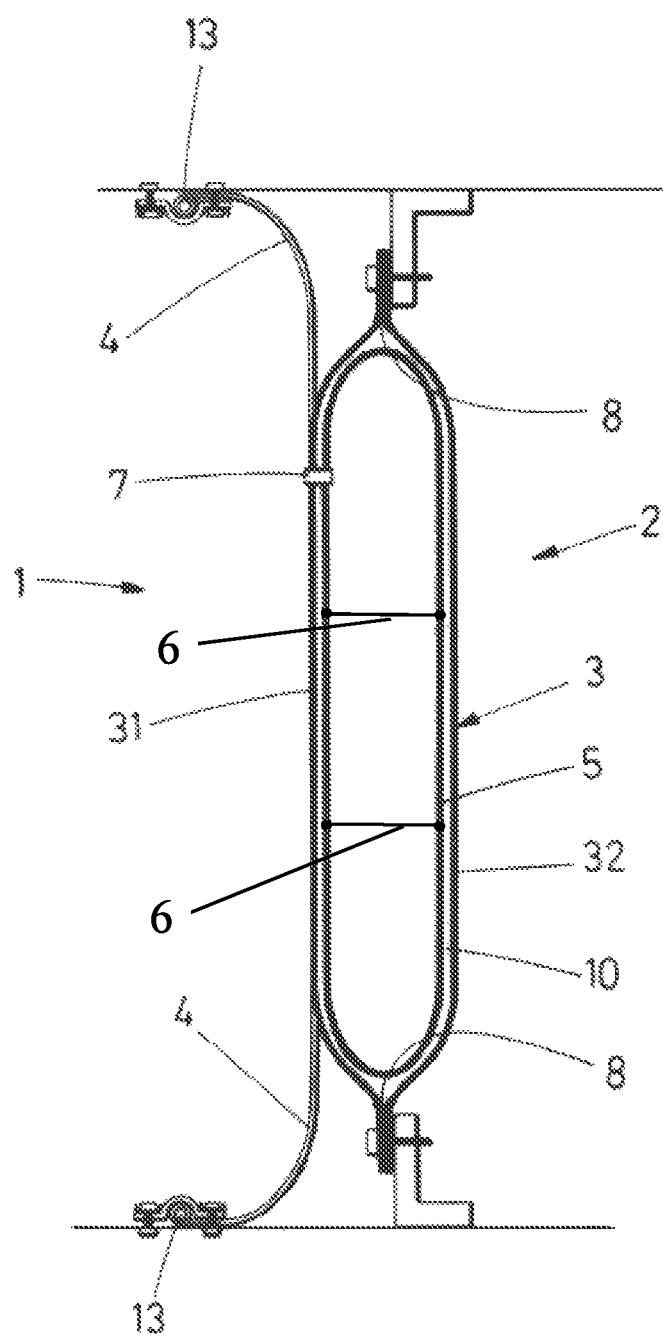
FIG. 4B shows a side view of the fourth embodiment of a pressure bulkhead according to the invention which includes strings.

FIG. 4A shows another particular embodiment of a pressure bulkhead (1) according to the invention. In this embodiment, the inner zone of the inflatable element comprises an inner inflatable bag (5). This inflatable bag (5) bears the pressure inside the inner zone, and the first and second sheets (31, 32) cover this inflatable bag (5). In this particular embodiment, as in the embodiments of FIG. 2, the sealing means are an auxiliary sheet (4) that provides an airtight seal between one of the sheets (31, 32) and the fuselage. The auxiliary sheet (4) is attached to the fuselage of the aircraft by secondary sealing fittings (13). In this particular embodiment, part of the inner side of the first sheet (31) is attached to part of the inner side of the second sheet (32), and the joint is attached to an element of the fuselage, such as a frame, by means of standard fittings. In other embodiments, the joint is attached to the fuselage itself. As shown in FIG. 4B, which includes the same features of FIG. 4A and therefore the same reference numerals, the inflatable bag (5) includes strings (6) attached to two points of the inflatable bag (5) to set a maximum distance between said points.

In some embodiments, the cover (3) is a flexible coated fabric. The flexible cover can undergo large deformations without a detrimental effect in material mechanical properties. In a particular embodiment, the flexible cover comprises fibers with a base fabric of aramid, nylon or ultra-high-molecular-weight polyethylene and a coating of silicone or polyurethane such as CSM (Chlorosulphated Polyethylene) or TPU (thermoplastic polyurethane).

Further, all of the embodiments shown in FIGS. 1 to 3 comprise an inflation valve (7) suitable for controlling the pressure inside the inflatable element (2). However, this is not an essential element, and therefore other embodiments do not comprise such a valve.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A pressure bulkhead for an aircraft comprising a fuselage, the pressure bulkhead comprising:
    an inflatable element filled with air, comprising a cover which delimits an inner zone, the cover comprising a first sheet and a second sheet; and
    sealing means providing an airtight seal between the cover and the fuselage of the aircraft, and
    wherein each of the first sheet and the second sheet comprises:

an inner side which faces the inner zone of the inflatable element; and an outer side, opposite to the inner side, and, wherein the first sheet and the second sheet are attached to each other by attaching means.

2. The pressure bulkhead according to claim 1, wherein the sealing means comprise sealing fittings attaching at least one of the first and second sheets to the fuselage of the aircraft.

3. The pressure bulkhead according to claim 1, wherein the sealing means comprise:

an auxiliary sheet attached to at least one of the first and second sheets; and, sealing fittings attaching the auxiliary sheet to the fuselage of the aircraft.

4. The pressure bulkhead according to claim 1, wherein part of the outer side of the first sheet is attached to part of the inner side of the second sheet.

5. The pressure bulkhead according to claim 1, wherein part of the inner side of the first sheet is attached to part of the inner side of the second sheet.

6. The pressure bulkhead according to claim 1, wherein the attaching means comprise at least one of gluing means or thermal joining means.

7. The pressure bulkhead according to claim 1, wherein the inner zone of the inflatable element comprises at least one string that is attached to a point of the first sheet and a point in the second sheet, to set a maximum distance between said points.

8. The pressure bulkhead according to claim 1, wherein the inner zone comprises an inner inflatable bag comprising an inner zone.

9. The pressure bulkhead according to claim 8, wherein the inner zone of the inflatable bag comprises at least one string that is attached to two points of the inflatable bag to set a maximum distance between said points.

10. The pressure bulkhead according to claim 1, further comprising an inflation valve controlling the pressure inside the inflatable element.

11. The pressure bulkhead according to claim 1, wherein the cover is made of a flexible material comprising:

fibers made of one of aramids, nylon or ultra-high-molecular-weight polyethylene, and wherein the flexible material further comprises a matrix.

12. The pressure bulkhead according claim 11, wherein the matrix comprises silicone or polyurethane.

13. A pressure bulkhead for an aircraft comprising a fuselage, the pressure bulkhead comprising:

an inflatable element filled with air, comprising a cover which delimits an inner zone, wherein the inner zone comprises an inner inflatable bag comprising an inner zone, and wherein the inner zone of the inflatable bag comprises at least one string that is attached to two points of the inflatable bag to set a maximum distance between said points; and, sealing means for providing an airtight seal between the cover and the fuselage of the aircraft.

14. The pressure bulkhead according to claim 13, further comprising an inflation valve controlling the pressure inside the inflatable element.

* * * * *